March 31, 1942.   R. S. SINK   2,277,789
APPARATUS FOR MOLDING BRICKS, BLOCKS AND TILE
Filed May 3, 1939   3 Sheets-Sheet 1

Inventor
Russell S. Sink,
Milburn & Milburn
Attorneys

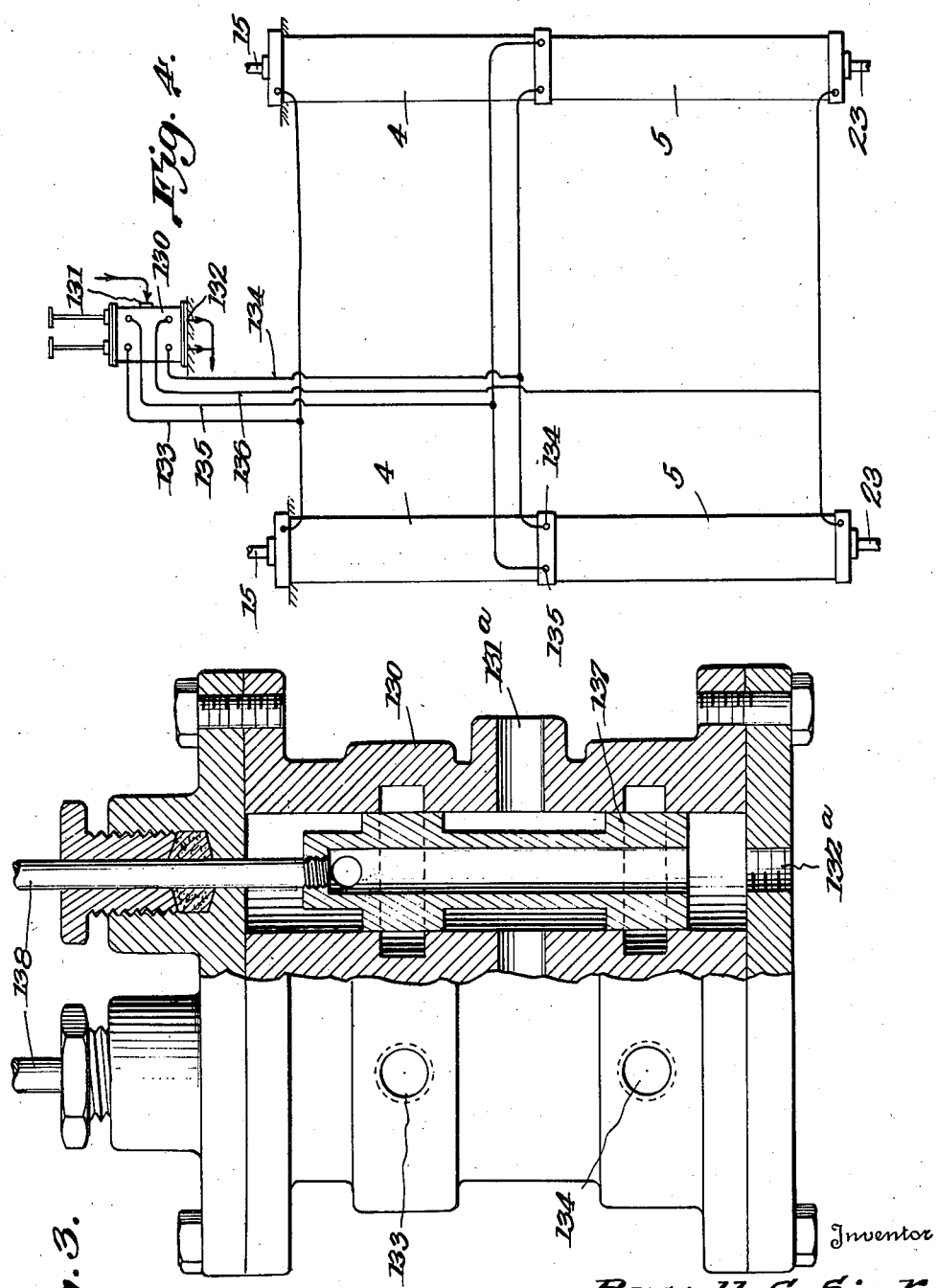

Patented Mar. 31, 1942

2,277,789

UNITED STATES PATENT OFFICE 2,277,789

APPARATUS FOR MOLDING BRICKS, BLOCKS, AND TILES

Russell S. Sink, Laramie, Wyo.

Application May 3, 1939, Serial No. 271,578

3 Claims. (Cl. 25—41)

This invention relates to the production of bricks, blocks, tiles and like articles from clay, concrete or other plastic materials, and particularly to the manufacture of hollow blocks, pipes and sewer tile.

In the production of molded articles of this character the plastic material, when formed by ordinary methods in molds of the desired size and shape, has been found to contain so large a percentage of voids as to interfere seriously with the strength and smoothness of the product. Elimination of these voids, to secure greater compactness of the material in the molded products, has been attempted by shaking or vibrating the molds in various ways during the molding process, and by applying pressure to the material while in the mold.

The pressure method has been used in the making of hollow, as well as solid, blocks, bricks and tile. For compacting the material of the hollow products the mold cores, instead of being stationary, have been so arranged and operated as to move into the plastic material in the mold and create the necessary cavity therein by a pushing, boring or wedging action. Carrying out this idea the material has been subjected to an accompanying vibration through the vibration of the moving core, which, in such instances, has been operated by electricity or compressed air, in a manner resembling the actuation of the well known electric or pneumatic hammer or vibrator. In compacting devices of this character the movable core is in effect a rammer, but is incapable of producing compactness of material to the desired degree because its vibrations are only axial movements and do not operate laterally or radially to apply compressive force in the direction in which it would be most effective.

Radial or circumferential expansion of the rammer has been proposed, but devices of this sort, generally composed of relatively movable sections designed to move outwardly by centrifugal action, have been complicated, expensive, difficult to maintain in operative condition, and of little or no value from a practical standpoint.

My invention has for its principal object the molding of articles, such as bricks, blocks, tile, pipe, etc., from plastic material in such a manner as to leave practically no voids and produce articles of exceptional strength and smoothness.

An important object is the provision of an improved method of molding bricks, blocks, pipes, etc.

Another object is the provision of a machine including a device for effecting a higher degree of compactness of the plastic material in hollow blocks, bricks, tile and other plastic products than has heretofore been attained.

Another object is the provision of an improved form of a compacting device, adapted to be embodied in a rammer for molded articles, such as sewer pipe, hollow blocks and tile, and bricks, blocks and the like which have cavities or recesses therein.

Other objects, uses and advantages of the invention will become apparent to those skilled in the art from a contemplation of the invention as described hereinafter.

My invention basically resides in the idea of compacting plastic material in a mold for forming blocks, brick, hollow tile or pipe by ramming the material with a compacting device which has a gyratory movement. This generally gyratory device is essentially a rammer, and will, with this understanding of the meaning of the term, be so designated.

My gyratory rammer forms an essential and the most important element of my invention, and, in its preferred embodiment, is incorporated in machines of novel construction for the production of pipes, hollow tile and similar hollow articles, and also articles which are not strictly hollow, but contain cavities of various shapes and extent. Wherever the term "hollow" appears in the specification or claims, it should be understood as referring to articles which are entirely hollow, e. g., sewer pipes, or articles which, although not entirely hollow, have (one or more) recesses, cavities or depressions therein.

Broadly stated my invention consists in a molding apparatus including a material compacting device having a generally gyratory motion, and a method of molding by generally or substantially gyratory compactive action.

More specifically the invention comprises the means by which the gyratory motion of my improved rammer is produced, viz., the structure and arrangement of the rammer in relation to the other parts of the machine, including an unbalanced fly wheel. Still more specifically the invention has to do with the structure of the unbalanced fly wheel and its location and arrangement with relation to the rammer and its operating means.

My compacting device, rammer or core is pivotally or resiliently supported adjacent the mold to move therein in a generally or substantially gyratory motion which, when without load on the rammer, takes the form of a true cone-shaped path about the axis of the point of support of the rammer, whatever the cross-sectional shape of the rammer; a rammer circular in cross-section, when operating under load in a mold filled with material, takes a substantially cone-shaped path; while a rammer of a different shape, e. g., square or hexagonal in cross-section, takes a path which is substantially pyramidal-shaped, the path generated varying according to the cross-sectional shape of the rammer. In the operation of a ramming element of square, hexagonal or other flat-sided shape, the action of the free end of the rammer, because of the restraint placed upon it by the material in the mold, is a combination of bumping (or hammering) and sliding. In other words, as the unbalanced fly wheel revolves the weight on the fly wheel (the specific means disclosed for causing the gyratory movement) throws the rammer against one portion of the inside face of the tile or block and then, as the rammer revolves or gyrates about its axis of support, that face of the rammer slides on the hole surface and strikes another portion of the hole surface and continues in this manner around the hole surface, the bumping and sliding of the flat faces tending to produce flat hole faces and forming a hole in the material which is larger in cross-section than the cross-section of the rammer. The result of this manner of compactive action of the rammer constructed and arranged as described is that the material in the mold is very compact and has a smooth trowelled surface.

The invention will be fully understood from the description of the illustrative embodiments specifically disclosed, taken in connection with the drawings showing said embodiments, in which:

Fig. 3 is an enlarged vertical elevational view, partly in central section, of the valve construction shown in Fig. 1, and Fig. 4 is a diagrammatic view of the pipe connections between the valve and cylinders shown in Fig. 1.

Figure 1:
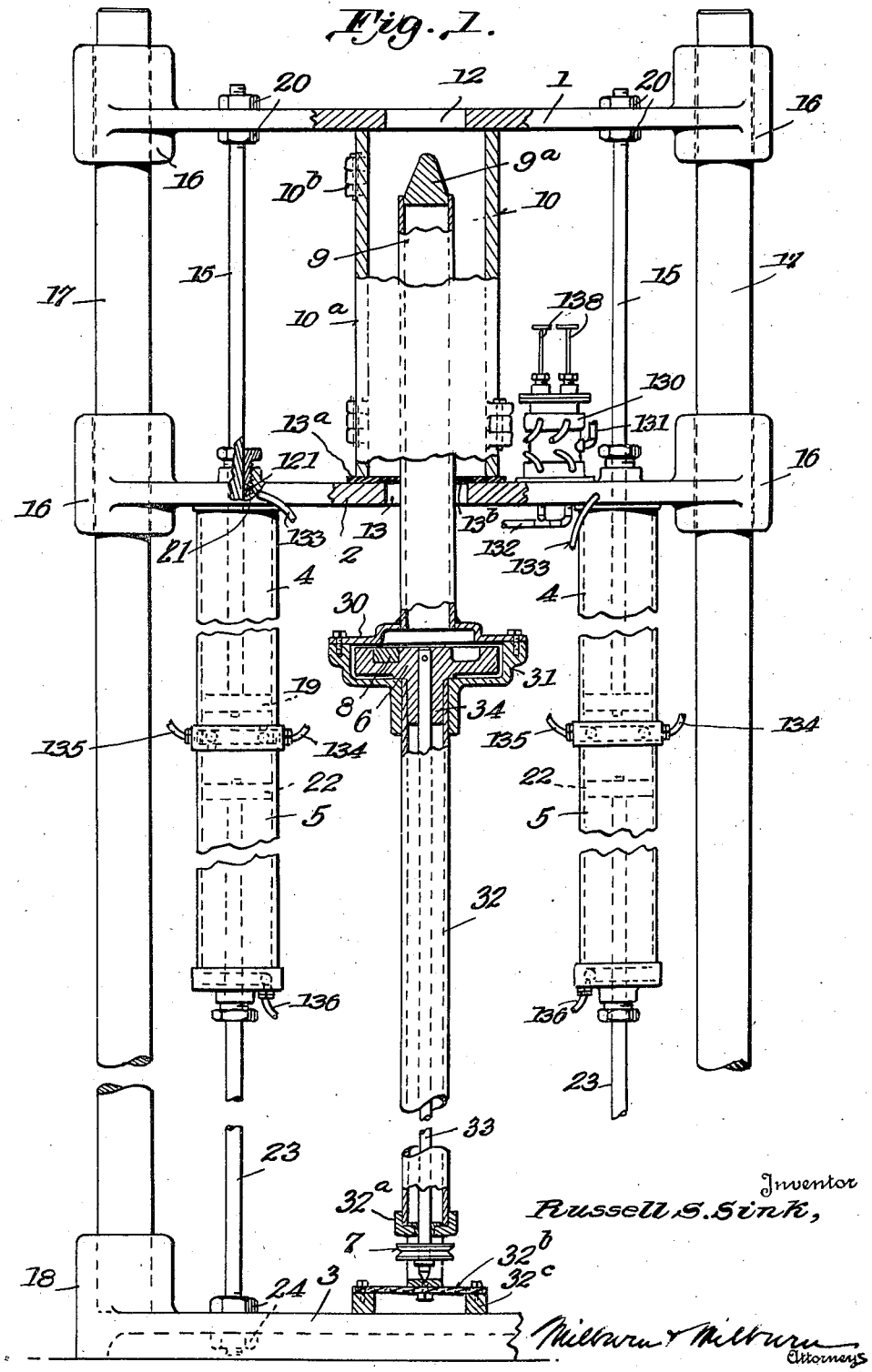
Fig. 1 is a vertical elevational view, partly broken away and partly in section, of my invention embodied in one form of hollow tile machine.

My invention, as embodied in a hollow tile machine, comprises an open-ended mold supported (either vertically or horizontally) on a suitable frame or base, and a core in the form of a rammer supported in alignment with the core opening of the mold, the rammer and mold being arranged for relative reciprocation. In effecting such relative reciprocation either the mold or the rammer, or both, may be moved toward or from the other. Any suitable power driven or hand-operated means for effecting this relative reciprocation may be employed, the specific form of means not being a part of my invention.

Two illustrative forms of hollow tile mold are depicted in the drawings. That in Fig. 1 shows the mold so arranged as to be movable downwardly toward or upon the rammer, while the Fig. 2 form has the relative positions reversed, the mold being movable upwardly toward the rammer.

In each of these embodiments of the invention, the mold is moved by fluid-pressure means while the rammer remains stationary except for its gyratory movement. In other contemplated embodiments of my invention, however, the mold may remain stationary or both the rammer and the mold may be moved. Also, the relative movement of the mold and rammer may be produced by suitable gearing or other mechanical or electrical means, instead of by the fluid-pressure means illustrated.

The mold may be of the well known sectional type, formed of two or more hinged sections, but a unitary mold may be used, in which event it may be secured to one of the frame members and suitable ejecting means provided for removing the compacted material upon completion of the molding operation and separation of the clamping frame members.

In the hollow brick or tile machine illustrated in Fig. 1 a mold 10, preferably of sections 10a connected by hinges 10b and open at each end, is supported in vertical position on a vertically movable frame by being clamped between frame members 1, 2. Frame members 1, 2, at each end have preferably integral collars 16 embracing and slidably engaging standards 17 securely positioned in and supported in upright position by sockets 18 in a base 3. If desired either of the members 1 or 2 may be clamped, through collars 16, to standards 17 and the other frame member moved relative to it for clamping and unclamping the mold 10.

Any suitable means for raising and lowering the mold frame may be employed. Cams or other power-actuated devices or even hand-operated levers, may be used, the specific means illustrated being intended merely as an example of such suitable means and in order to complete the disclosure of an operative machine. In the drawings this means comprises cylinders 4, 4 and 5, 5 disposed beneath the frame, which cylinders may be operated by hydraulic, pneumatic or steam power, for respectively clamping the mold 10 between members 1, 2 while the tile is being rammed and moving members 1, 2 and mold 10 downwardly and upwardly during the cycle of movements which constitute the ramming and molding operation.

Cylinders 4, 4 are preferably piston cylinders in which operate in the usual manner piston heads 19 on piston rods 15 fixedly secured to frame member 1 by clamping nuts 20 and passing through an opening 21 in frame member 2 to permit relative slidable movement between frame member 2 and piston rod 15. Opening 21 may be provided with suitable packing, such as the packing gland 121.

Cylinders 5, 5 separated from cylinders 4, 4 by the usual cylinder heads, have working in them piston heads 22 on piston rods 23 secured to base 3 by nuts 24.

Suitable connections and valves are provided in association with cylinders 4, 4 and 5, 5 for admitting fluid pressure to the cylinders in such manner as to force frame member 2 upwardly sliding on piston rods 15 to clamp the mold 10 between frame members 2 and 1, and to alternately raise and lower cylinders 5, 5 (and the cylinders 4, 4, frame members 2, 1 and mold 10 supported thereon), the raising and lowering movement being effected by the sliding of the cylinders 5, 5 upon piston rods 23. The apparatus illustrated, comprising one of various possible arrangements, includes valve casing 130 connected with a suitable pump or other source of fluid pressure (not shown) by pipes 131, 132 secured in openings 131a and 132a, respectively, and by pipes 133, 134 and 135, 136 with the opposite ends of the piston chambers of cylinders 4, 5 respectively. Valve 130 may be of any suitable type or construction, that shown by way of illustration comprising a pair of pistons 137 controlling the openings to pipes 133, 134, 135, 136, and preferably manipulated by hand levers 138.

For compacting the plastic material in mold 10 during the molding operation ramming means are provided in the form of a gyratory rammer 9 so supported as to be introduced into the mold 10 and removed therefrom in the course of the molding operation. Rammer 9 is preferably tapered at its free end 9a, the degree and extent of taper being variable as may be necessary or desirable in the use of the machine for molding different materials.

The rammer 9 may be supported in various ways by which it may be given a gyratory movement in a substantially cone-shaped path, when rotated without load, before the mold is filled with material to be compacted, and in a path which, dependent upon the cross-sectional shape of the rammer, may be either substantially conical or substantially pyramidal when the rammer is rotated under the load of compacting the mold material. In the specific embodiment of the invention illustrated, the rammer 9 is secured to the cover 30 of a casing 31 carried by a tubular member 32 supported in upright position on base 3, but capable of limited lateral movement. Various expedients for affording or permitting such movement may be used, that illustrated comprising the mounting of tubular member 32 in a stirrup 32a secured upon a resilient plate 32b of spring steel or other suitable material supported on spaced blocks 32c on base 3.

A shaft 33 within tubular member 32, rotated by suitable power through drive pulley 7, serves as the driving means for the rammer, the rotation of shaft 33 and of the fly wheel 6 within the casing 31 imparting to the casing and to the rammer 9 mounted thereon a gyratory movement arising from the unbalanced condition of the fly wheel caused by the presence of one or more unbalancing weights 8, which may be of lead or other suitable metal. The generally gyratory movement imparted to the rammer when the latter is without load takes the form, in the rammer 9 and its supporting tubular casing 32 as a whole, of a movement in a substantially cone-shaped path about an apex which is the point of pivotal or resilient support of the casing 32 and shaft 33 on base 3; when loaded, i. e., when operating in a mold filled with material to be compacted, the rammer 9 and casing 32 move about their point of support on base 3 in a substantially pyramidal-shaped path.

Figure 2:
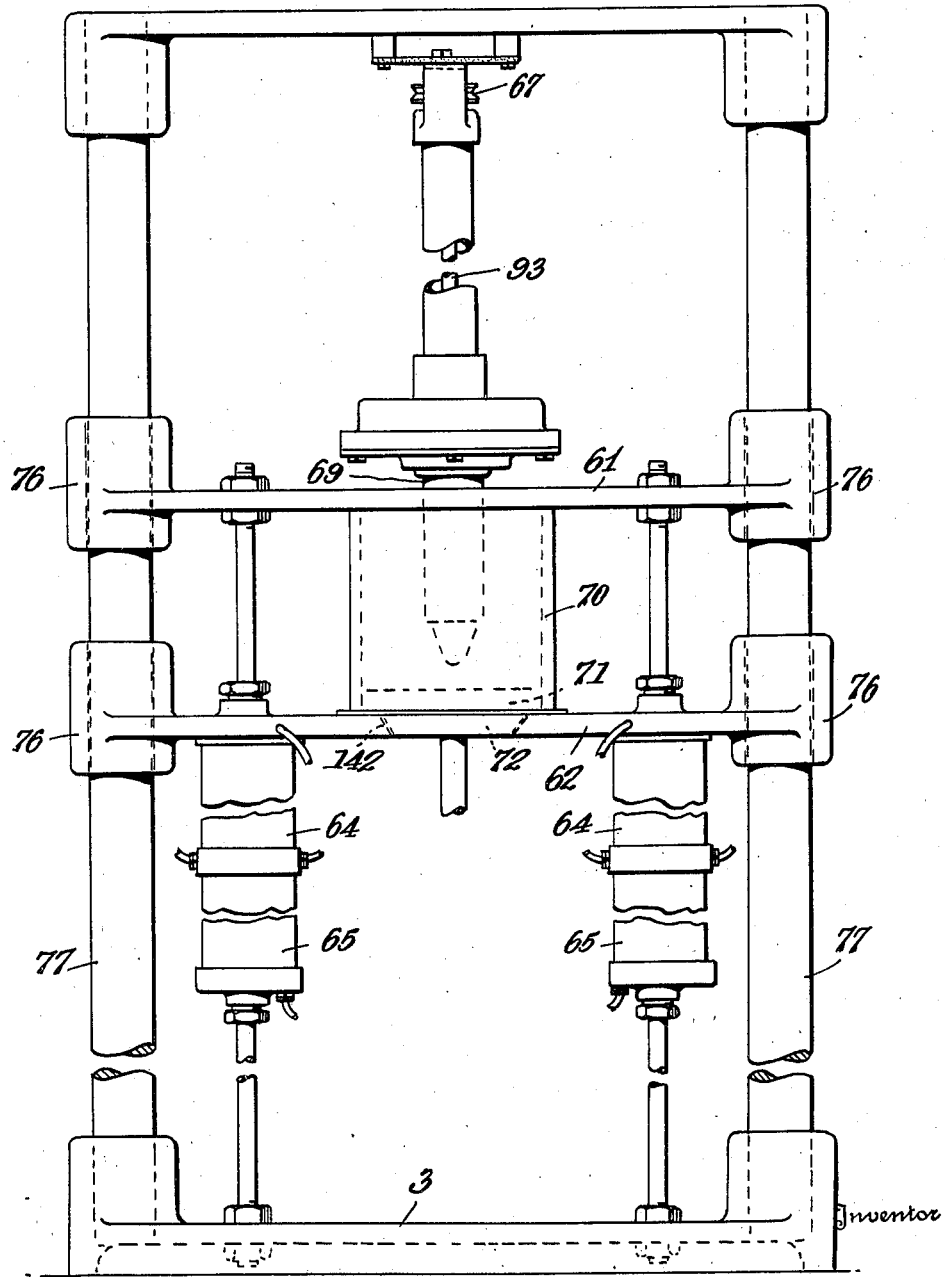
Fig. 2 is a view similar to Fig. 1 of another specifically different form of hollow tile machine embodying my invention.

The construction and mode of operation of the apparatus shown in Figs. 1 and 2 are identical, the principal difference between the two forms residing in the relative positions of the mold and rammer. In the Fig. 2 form the mold 70 is mounted on its frame members 61, 62 and cylinders 64, 64, and 65, 65 to move upwardly on standards 77 guided by arms 76 to cause the introduction of the rammer 69 into the mold chamber.

In Fig. 2 the mold is shown, by way of example, as a unitary mold, with one end closed, for the making of tile with one solid or closed end, suitable for use as trim tiles at the corners of buildings and around doors and windows; the closure for the closed end may be a rigid plate or pallet 71 against which a plunger 72 may be moved by any suitable means for ejecting the molded article when the molding operation is completed and the mold and rammer have been separated.

It is to be understood, however, that my invention may be applied to any suitable type or form of mold, whether open at one end or at both ends, and whether of one piece or sectional.

In the operation of the apparatus shown in Fig. 1 the valves are actuated by manipulation of the proper handle 138 to admit fluid to cylinders 4, 4 to clamp mold 10 between frame members 1, 2. Concrete or other plastic material is then introduced into the mold through opening 12. The mold and its clamping frame members 1, 2 are then lowered, the rammer 9 in this way being introduced into and through (or substantially through) the mold 10, suitable clearance of the rammer in opening 13 permitting the gyratory movement of the rammer when so positioned. Opening 13 is closed by a pliant diaphragm 13a having an aperture 13b through which rammer 9 may pass.

Operation of the shaft 33 by drive pulley 7, modified by the unbalanced flywheel 6, sets up gyratory motion which is transmitted from shaft 33 through bushing 34 of bronze or other suitable material, casing 31, and cover 30 to the rammer 9 fixed to the cover. The gyrated shaft, being pivotally or resiliently secured at one end to base 3, moves in a substantially cone-shaped path about its point of support, this path being modified to substantially pyramidal when the rammer is polygonal in cross-section and operated under load. The rammer, by its gyratory movement in a substantially cone-shaped or pyramidal-shaped path, rams the plastic material outwardly against the mold as the latter descends. Any surplus material is pushed by the rammer out through opening 12 and deposited on frame member 1, as the end of the rammer projects through the opening. When the mold has reached its lowermost position the valves are operated to reverse the action of cylinders 5, 5 and cause the mold 10 to ascend. Either at the end of this upward movement, or after the downward and upward movements of the mold have been repeated one or more times (to secure successive packing operations of the mold material by the rammer), the cylinders 4, 4 are operated to unclamp frame members 1, 2 and release mold 10, which may then be stripped from the molded product. To repeat the molding cycle thus completed, the mold 10 is replaced and clamped between frame members 1, 2, the mold 10 is filled, and downward movement of the mold 10 and frame members 1, 2 inaugurated.

The apparatus shown in Fig. 2 is operated in a similar manner. Cylinders 64, 64 and 65, 65 are actuated to clamp mold 70 between frame members 61, 62 and to raise the mold, thus causing the introduction of rammer 69, which has a gyratory movement in a substantially cone-shaped or pyramidal-shaped path caused by the unbalanced flywheel on the anchored drive shaft 93 operated by power applied through drive pulley 67, the construction and operation of the drive shaft, unbalanced fly wheel and rammer being as shown and described in connection with Fig. 1.

The gyrating rammer rams the plastic material solidly outwardly against the retaining mold, leaving a cavity in the product of the same cross-sectional shape as the rammer, but larger than the rammer because of its amplitude of gyration, which, of course, may be varied by altering the structure and manner of mounting the rammer and by varying the dimensions of the fly wheel and the weight and location of the unbalancing weight or weights 8. The depth of penetration of the rammer into the mold will depend upon the particular plastic material used and the volume of material in the mold.

When the molding operation is completed the molded article may be removed from the mold by separation of frame members 61, 62, and opening of the hinged mold sections 10a (if a sectional mold is used), or operation of a suitable ejector 72, against a rigid diaphragm or pallet 71, slidable inside the mold covering opening 142.

The mold may be round, square, hexagonal or of any desired cross-section and its vertical contour need not be straight nor vertical. It may be of such cross-section that a plurality of brick or tile may be made simultaneously and by one operation, by the use of one or more rammers. Likewise, the rammer may be of any desired cross-sectional shape, but must be round, square, hexagonal or of such vertical contour that it may be withdrawn after the ramming operation. By the use of molds closed at one end and suitable regulation of the extent of entry of the rammer into the mold, the machine shown in Fig. 1 or that shown in Fig. 2 may be operated to produce thoroughly compacted brick, block or tile having one or more cavities or recesses of different depth, as desired.

I claim:

1. Apparatus of the character described, comprising a stationary support, a mold mounted on said support and having an opening in its bottom, a core resiliently secured at one end on said support and disposed in vertical position beneath said mold with its free end projecting within said mold through said opening, and means coaxial of said core and below said mold opening for imparting to said core material-compacting motion in a generally circular path and transversely relative to the walls of the mold.

2. In apparatus of the character described, a mold having an opening therein, a stationary support, a tubular casing resiliently mounted at one end on said support, in alignment with said mold opening, an elongated rammer supported on the free end of said casing in axial alignment therewith and projecting through said mold opening, the free end of said casing and said rammer being free to move in a substantially circular material-compacting path about the resiliently-mounted end of said casing as an apex, a rotatable shaft within said casing in axial alignment with said mold opening, power means for rotating said shaft, and an unbalanced flywheel on said shaft between the mounted end of said casing and said mold opening for imparting to said casing and said rammer motion in a substantially cone-shaped path, the motion of said rammer in such path being a material-compacting motion transversely of the walls of said mold opening.

3. In apparatus of the character described, a stationary base, a mold mounted on said base, said mold having a vertically-disposed opening in the bottom thereof, a tubular casing pivotally mounted at one end on said base beneath the mold and in vertical axial alignment with said mold opening, a rotatable shaft within said casing in vertical axial alignment with said mold opening, an unbalanced flywheel on said shaft and enclosed within said casing below said mold opening, an elongated rammer mounted on the other end of said tubular casing in vertical axial alignment therewith and projecting into said mold through said mold opening, and power means for rotating said shaft and said flywheel and thereby imparting to said casing and said rammer material-compacting motion in a substantially cone-shaped path about the pivot mounting of said casing as an apex, the material-compacting motion of said rammer in a substantially cone-shaped path being transversely relative to the walls of the mold opening.

RUSSELL S. SINK.